United States Patent
Anderl

(10) Patent No.: US 8,670,754 B2
(45) Date of Patent: Mar. 11, 2014

(54) REUSABLE MULITMODAL APPLICATION

(75) Inventor: Ewald C. Anderl, Middletown, NJ (US)

(73) Assignee: Waloomba Tech Ltd., L.L.C., Wilmington, DC (US)

( * ) Notice: Subject to any disclaimer, the term of this patent is extended or adjusted under 35 U.S.C. 154(b) by 0 days.

(21) Appl. No.: 13/491,424

(22) Filed: Jun. 7, 2012

(65) Prior Publication Data

US 2012/0245946 A1 Sep. 27, 2012

Related U.S. Application Data

(62) Division of application No. 11/418,896, filed on May 5, 2006, now Pat. No. 8,213,917.

(51) Int. Cl.
*H04L 29/08* (2006.01)

(52) U.S. Cl.
USPC ........................................ 455/414.4

(58) Field of Classification Search
USPC ........................ 455/414.4; 370/338
See application file for complete search history.

(56) References Cited

U.S. PATENT DOCUMENTS

| | | | |
|---|---|---|---|
| 5,828,468 A | 10/1998 | Lee et al. |
| 5,844,979 A | 12/1998 | Raniere et al. |
| 5,944,791 A | 8/1999 | Scherpbier |
| 6,018,710 A | 1/2000 | Wynblatt et al. |
| 6,101,510 A | 8/2000 | Stone et al. |
| 6,125,376 A | 9/2000 | Klarlund et al. |
| 6,195,357 B1 | 2/2001 | Polcyn |
| 6,208,839 B1 | 3/2001 | Davani |
| 6,282,511 B1 | 8/2001 | Mayer |
| 6,349,132 B1 | 2/2002 | Wesemann et al. |
| 6,366,578 B1 | 4/2002 | Johnson |
| 6,418,199 B1 | 7/2002 | Perrone |
| 6,424,945 B1 | 7/2002 | Sorsa |
| 6,490,603 B1 | 12/2002 | Keenan et al. |
| 6,570,966 B1 | 5/2003 | Freeman et al. |
| 6,594,348 B1 | 7/2003 | Bjurstrom et al. |
| 6,604,075 B1 | 8/2003 | Brown et al. |

(Continued)

FOREIGN PATENT DOCUMENTS

| | | |
|---|---|---|
| EP | 0848373 | 6/1998 |
| EP | 1100013 | 5/2001 |

(Continued)

OTHER PUBLICATIONS

Hickey et al., "Multimodal Requirements for Voice Markup Languages", W3C Working Drafts, Jul. 10, 2000, 1-17.

(Continued)

*Primary Examiner* — Marcos Batista
(74) *Attorney, Agent, or Firm* — Woodcock Washburn LLP

(57) ABSTRACT

A method and system are disclosed herein for accepting multimodal inputs and deriving synchronized and processed information. A reusable multimodal application is provided on the mobile device. A user transmits a multimodal command to the multimodal platform via the mobile network. The one or more modes of communication that are inputted are transmitted to the multimodal platform(s) via the mobile network(s) and thereafter synchronized and processed at the multimodal platform. The synchronized and processed information is transmitted to the multimodal application. If required, the user verifies and appropriately modifies the synchronized and processed information. The verified and modified information are transferred from the multimodal application to the visual application. The final result(s) are derived by inputting the verified and modified results into the visual application.

20 Claims, 3 Drawing Sheets

(56) References Cited

U.S. PATENT DOCUMENTS

| | | |
|---|---|---|
| 6,606,611 B1 | 8/2003 | Khan |
| 6,757,718 B1 | 6/2004 | Halverson et al. |
| 6,766,298 B1 | 7/2004 | Dodrill et al. |
| 6,807,254 B1 | 10/2004 | Guedalia et al. |
| 6,842,767 B1 | 1/2005 | Partovi et al. |
| 6,983,307 B2 | 1/2006 | Mumick et al. |
| 7,116,765 B2 | 10/2006 | Summers et al. |
| 7,210,098 B2 | 4/2007 | Sibal et al. |
| 7,289,606 B2 | 10/2007 | Sibal et al. |
| 7,657,652 B1 * | 2/2010 | Balaji .................. 709/242 |
| 2001/0006890 A1 | 7/2001 | Ryu |
| 2001/0018353 A1 | 8/2001 | Ishigaki |
| 2002/0095293 A1 | 7/2002 | Gallagher et al. |
| 2002/0194388 A1 * | 12/2002 | Boloker et al. ............ 709/310 |
| 2003/0032456 A1 | 2/2003 | Mumick et al. |
| 2003/0071833 A1 | 4/2003 | Dantzig et al. |
| 2003/0162561 A1 | 8/2003 | Johnson et al. |
| 2003/0179865 A1 | 9/2003 | Stillman et al. |
| 2003/0187656 A1 | 10/2003 | Goose et al. |
| 2003/0208472 A1 | 11/2003 | Pham |
| 2004/0006474 A1 | 1/2004 | Gong et al. |
| 2004/0034531 A1 | 2/2004 | Chou et al. |
| 2005/0010892 A1 | 1/2005 | McNair et al. |
| 2005/0049862 A1 | 3/2005 | Choi et al. |
| 2005/0203747 A1 | 9/2005 | Lecoeuche |
| 2005/0251746 A1 | 11/2005 | Basson et al. |
| 2005/0273487 A1 | 12/2005 | Mayblum et al. |
| 2005/0288063 A1 | 12/2005 | Seo et al. |
| 2006/0165104 A1 | 7/2006 | Kaye |
| 2006/0287845 A1 | 12/2006 | Cross et al. |
| 2007/0260972 A1 | 11/2007 | Anderl |
| 2008/0086564 A1 | 4/2008 | Putman et al. |

FOREIGN PATENT DOCUMENTS

| | | |
|---|---|---|
| EP | 1423968 | 6/2004 |
| EP | 1873661 | 1/2008 |
| EP | 2050015 | 4/2009 |
| WO | WO 99/46920 | 9/1999 |
| WO | WO 99/55049 | 10/1999 |
| WO | WO 2004/014053 | 2/2004 |
| WO | WO 2004/077798 A2 | 9/2004 |
| WO | WO 2007/130256 | 11/2007 |

OTHER PUBLICATIONS

Huang et al., "MIPAD: A next generation PDA Prototype", Proceedings of the International Conference on Spoken Language Processing, Beijing, China, Oct. 16, 2000, 1-4.

International Patent Application No. PCT/US2002/21058: International Search Report dated Dec. 16, 2002, 4 pages.

International Patent Application No. PCT/US2002/24885: International Search Report dated Nov. 26, 2002, 1 page.

International Patent Application No. PCT/US2007/009102: International Search Report dated Feb. 25, 2008, 2 pages.

International Patent Application No. PCT/US2007/009102: Written Opinion dated Feb. 25, 2008, 2 pages.

Kennedy et al., "HTML, The Definitive Guide, Third Edition", Copyright 1998, pp. 211-215.

Lau et al., "WebGALAXY: Beyond point and click—A Conversational Interface to a Browswer", Computer Networks and ISDN Systems, Sep. 1997, 29(8-13), 1385-1393.

Maes et al., "Multi-model Interaction in the age of information appliances", Multimedia and Expo, 2000, ICME 2000, 2000 IEEE International Conference on NY, NY, Jul. 30-Aug. 2, 2000, 1, 15-18.

Niklfeld et al., "Component-Based multimodal dialog interfaces for mobile knowledge creation", Proceedings of the ACL 2001 Workshop on Human Language Technology and Knowledge Management, Toulouse, France, Jul. 6-7, 2001, 1-8.

Pavlovski, C. J. et al., "Reference architecture for 36 thin client multimodal applications," Communications and Information Technology, 2004. ISCIT 2004. IEEE International Symposium, Sapporo, Japan. Oct. 26-29, Piscataway, NJ, USA, IEEE, vol. 2, Oct. 26, 2004, pp. 1192-1197.

European Patent Application No. 07755388, Supplementary European Search Report dated Jan. 24, 2013, 8 pages.

* cited by examiner

REUSABLE MULITMODAL APPLICATION

CROSS REFERENCE TO RELATED APPLICATIONS

This application is a divisional of U.S. patent application Ser. No. 11/418,896, titled "Reusable Multimodal Application," filed on May 5, 2006.

This application is related to U.S. patent application Ser. No. 10/211,117, titled "System and Method for Providing Multi-Modal Bookmarks," filed Aug. 2, 2002, U.S. Pat. No. 6,983,307, titled "Synchronization among plural browsers", U.S. application Ser. No. 10/119,614, titled "Mode-Swapping in Multi-Modal Telephonic Application," filed Apr. 10, 2002, and U.S. application Ser. No. 10/369,361 titled "Technique for Synchronizing Visual and Voice Browsers to Enable Multi-Modal Browsing," filed Feb. 18, 2003. The entirety of each of the aforementioned patent applications is hereby incorporated herein for all purposes.

BACKGROUND

The present invention relates generally to the field of networked computing. More particularly, the invention provides a reusable multimodal application on a mobile device. As used herein, multimodality comprises any human mode of interaction on the input side of an application, for example, the user's voice, and/or any visual mode, etc., that allows users to speak, hear, type, touch or see in that application, and one or more human interaction modes on the output side of the application such as the ability to hear and visually see the output. Multimodal interactions thus extend web or other application user interface to allow multiple modes of interaction, offering users, for example, the choice of using their voice, or an input device such as a key pad, keyboard, mouse or stylus. For output, users will, for example, be able to listen to spoken prompts and audio, and to view information on graphical displays.

The market for ring tones, wall papers, and other content is a large and rapidly growing business for mobile operators and content providers. In addition, a significant number of commercial transactions take place over wireless application protocol (WAP) capable mobile devices. The content in the top-level menu visual interface of the WAP capable mobile devices need to be easily accessible to the user in order to effectively perform commercial transactions. Content that cannot be easily found and located by subscribers directly is a lost revenue opportunity for mobile operators and content providers.

Increasingly, applications are moved from a static environment, for example, a desktop computer, to a mobile environment or a set-top box environment, where the mobile devices are smaller and packed with functionalities. The keypad input facility in the mobile device is not user friendly for all types of input operations, and the ability to interact is constrained by the form factor of the device. There is an opportunity to improve the effectiveness in the use of current mobile visual applications on mobile devices, for example, for mobile devices using a browser, WAP, or x hyper text markup language (xHTML).

There is an unmet market need for a method and system that precludes the need of performing custom development for each application in order to provide a multimodal functionality to the mobile device.

There is an unmet market need for a method and system that implements multimodal functionality without requiring a replacement of the entire software or hardware infrastructure of the mobile device.

SUMMARY

Disclosed herein is a method and system for accepting multimodal inputs and deriving synchronized and processed information. A reusable multimodal application is provided on the mobile device. A user transmits multimodal commands to the multimodal platform via the mobile network. The one or more modes of communication that are inputted are transmitted to the multimodal platform(s) via the mobile network(s) and thereafter synchronized and processed at the multimodal platform. The synchronized and processed information is transmitted to the multimodal application. If required, the user verifies and appropriately modifies the synchronized and processed information. The verified and modified information is transferred from the multimodal application to the visual application. The final result(s) are derived by inputting the verified and modified information into the visual application.

The multimodal application seamlessly combines graphics, text and audio output with speech, text, and touch input to deliver dramatically enhanced end user and services experiences. Compared to single-mode voice and visual search applications, the multimodal application of this invention is easier and more intuitive to use. The method and system disclosed herein provides a multimodal application that allows the use of a plurality of modes of communication, whichever is desired or most effective depending on the data needed or the usage environment.

Also disclosed herein is a method using a multimodal application that serves, using a simple set of interface rules, a standard multimodal interface to any visual search interface. The multimodal application of this invention requires input from the user to determine a specific selection among a list of possible results. For example, the multimodal application could be used for searching a music album from among hundreds of possible selections.

The method disclosed herein enhances the selection process of menus on a mobile device by allowing the user to select from a visual list of choices using one or more modes of input.

Also disclosed herein is a method providing a multimodal application that precludes the need of performing custom development for each application in order to provide a multimodal functionality to the mobile device.

Also disclosed herein is a method of implementing multimodal functionality without requiring a replacement of the entire software or hardware infrastructure of the mobile device, for example, without the need to install a new browser on the mobile device.

Also disclosed herein is a method to enable telecommunications carriers to extend their existing visual based portals with text or touchtone input modes, and store-fronts on the mobile device, with a search capability capable of accepting multiple modes of input. For example, it is convenient for the users to speak the service or information topic that they are interested in, and see the service appear immediately on the phone, often bypassing several levels and menus in the process. It is also much easier to speak the name of a category, title, or artist and see that filled in as the text search criteria automatically. By making more content on the mobile device easily accessible, content providers and carriers can realize increased revenues.

The method disclosed herein also reduces the time taken to access a desired menu choice by optimally enabling multiple modes on a mobile device. For example, the method disclosed herein can reduce the time of choosing a desired menu from approximately thirty seconds and five key clicks down to three seconds and only one key click. Even if the menu structure in a portal on the mobile device were to change frequently, the multimodal application would enable the user to continue to effectively conduct transactions on the mobile device without difficulty.

A reusable multimodal application offers a significant revenue opportunity, and more importantly, a market capture and retention opportunity for the mobile operator. Capturing this opportunity is essential in the face of declining average revenue per user (ARPU) and increasing competitive pressure. By delivering a user-friendly multimodal experience, barriers to a user's adoption of new mobile applications and services are significantly reduced. A multimodal application offers opportunities including additional usage, bi-directional pull through of voice and data services, increased revenue from content providers, advertising revenue, premium services, churn reduction and upgrade potentials. The multimodal application gives workers operating in a mobility context, the opportunity to access and leverage the same systems and information that colleagues close to intranet resources enjoy.

BRIEF DESCRIPTION OF THE DRAWINGS

The foregoing summary, as well as the following detailed description of the embodiments, is better understood when read in conjunction with the appended drawings. For the purpose of illustrating the invention, there is shown in the drawings exemplary constructions of the invention; however, the invention is not limited to the specific methods and instrumentalities disclosed.

DETAILED DESCRIPTION OF ILLUSTRATIVE EMBODIMENTS

Figure 1:
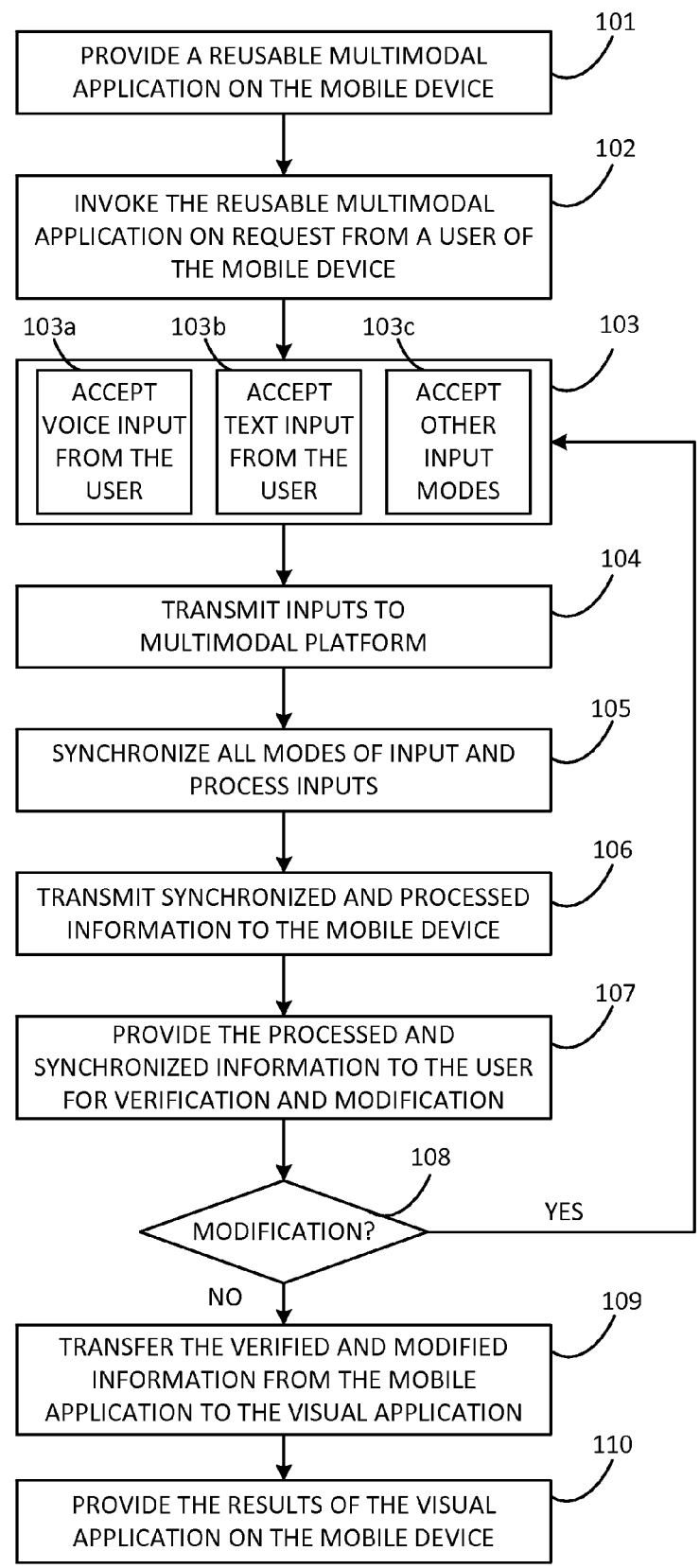
FIG. 1 illustrates a method of accepting multimodal inputs and deriving synchronized and processed information, the method implemented in a system comprising a plurality of mobile devices operated by users who are connected to a plurality of mobile networks that contains a plurality of multimodal platforms.

FIG. 1 illustrates a method of accepting multimodal inputs and deriving synchronized and processed information, the method implemented in a system comprising a plurality of mobile devices operated by users who are connected to a plurality of mobile networks that contains a plurality of multimodal platforms. The plurality of mobile devices contain a plurality of applications. The plurality of applications also comprise visual applications. A multimodal application enables multimodality in the plurality of applications that reside on a plurality of mobile devices 101. The multimodal application is invoked by invoking the visual application on the mobile device based on the request of the user 102. The multimodal application accepts input information from the user in one or more modes of communication 103, such as in voice 103a, text 103b and other input modes 103c. The one or more modes of communication that are inputted are transmitted to the multimodal platform(s) via the mobile network(s) 104 and then synchronized and processed 105 at the multimodal platform. The synchronized and processed information is transmitted to the multimodal application 106. The synchronized and processed information is provided to the user for verification and modification in one or more communication modes 107.

The following example illustrates the synchronizing and processing step. If the input information is a search request in the form of an audio command along with text input, then the audio command and the text input, along with the associated search grammar of the multimodal application is transferred to the multimodal platform through the mobile network. The two modes of input, i.e., the audio command and text input are synchronized. Grammar elements associated with the command and search grammar are recognized by the multimodal platform. Processed information in the form of search words is determined by the multimodal platform based on the recognized grammar elements, and the synchronized and processed information is transferred back to the multimodal application.

If required, the user verifies and appropriately modifies the synchronized and processed information 108. The verified and modified information is transferred from the multimodal application to the visual application 109. The final result(s) is derived by inputting the verified and modified results into the visual application. The final results are provided to the user in one or more modes of communication 110.

The system and method disclosed herein allows users to simultaneously use voice, text, graphics, keypad, stylus and haptic modes to interface with wireless services and applications.

Figure 2:
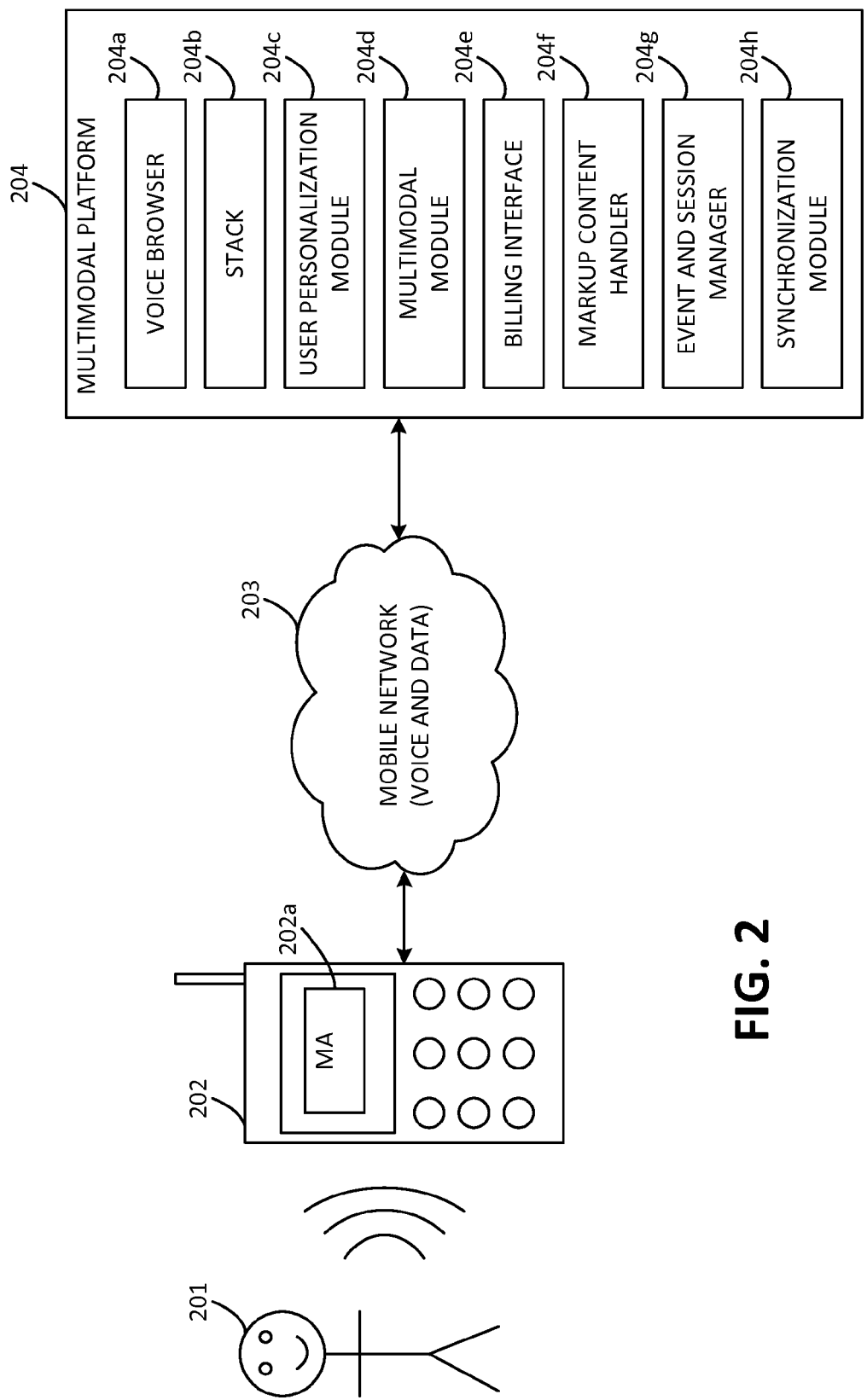
FIG. 2 illustrates a system for accepting multimodal inputs and deriving synchronized and processed information, comprising a plurality of mobile devices operated by users who are connected to a plurality of mobile networks that contains a plurality of multimodal platforms.

FIG. 2 illustrates a system for accepting multimodal inputs and deriving synchronized and processed information, comprising a plurality of mobile devices operated by users who are connected to a plurality of mobile networks that contains a plurality of multimodal platforms. The mobile device 202 comprises a multimodal application 202a that is capable of receiving inputs from the user 201 in multiple modes of input. The multimodal application 202a, uses a set of interface rules to provide a standard input interface on the mobile device 202. The mobile device 202 communicates with a multimodal platform 204 via a mobile network 203. The system disclosed herein comprises a plurality of mobile devices, multimodal platforms and mobile networks. The multimodal platform 204 further comprises of a voice browser 204a, stack 204b, user personalization module 204c, multimodal module 204d, billing interface 204e, a markup content handler 204f, event and session manager 204g, and synchronization module 204h. The voice browser 204a allows users to conduct searches using audio commands. The stack 204b is a reserved area of memory used to keep track of internal operations. The user personalization module 204c stores user specific information. The multimodal module 204d contains a grammar module for recognizing the grammar elements associated with an audio command. The billing interface 204e generates user specific billing information. The markup content handler 204f provides the visual markup or data content associated with the visual interface. Using the proposed invention, telecommunication carriers may monetize multimodal applications immediately, thereby leveraging devices already widely deployed in their networks. The event and session manager 204g manages the events and sessions for networking activities associated with the multimodal platform 204. The synchronization module 204h synchronizes the voice, visual and haptic modes of communication.

The method and system disclosed herein supports a plurality of mobile network 203, inclusive of, but not restricted to code division multiple access (CDMA), CDMA 1x/3x, global system for mobile communications (GSM), general packet radio service, (GPRS), universal mobile telecommunications system (UMTS), integrated digital enhanced network (iDEN), etc. The multimodal platform 204 receives the multimodal commands from the multimodal application 202a. The multimodal platform 204 synchronizes and processes the input information and transfers the synchronized and processed information to the multimodal application 202a located on the mobile device 202. The multimodal platform 204 enables wireless carriers and service providers to offer applications with integrated voice and visual interfaces. In accordance with the embodiments of the method disclosed herein, the multimodal platform 204 may facilitate communication with mobile device 202 in multiple communication modes. For example, the multimodal platform 204 may be adapted to send audio information to and receive audio information from wireless telephone through a switch using a voice channel. The multimodal platform 204 may likewise be adapted to send visual data to and receive visual data from the mobile device 202 through a switch using a data channel. Moreover, the multimodal platform 204 may be adapted to change between these multiple modes of communication, or make multiple modes available simultaneously, according to instructions or existing communications conditions. The multimodal platform 204 may be embodied as a computing device programmed with instructions to perform these functions. In one embodiment of the invention, the voice and data connections run simultaneously over an internet protocol (IP) connection between the multimodal platform 204 and the multimodal application 202a. The multimodal platform 204 is described in greater detail in U.S. Pat. No. 6,983,307, titled "Synchronization Among Plural Browsers", and U.S. application Ser. No. 10/369,361 titled "Technique for Synchronizing Visual and Voice Browsers to Enable Multi-Modal Browsing," filed Feb. 18, 2003.

The multimodal application 202a that accepts a plurality of modes of input, can be implemented in a number of ways. For example, the multimodal application can be implemented as a Java 2 micro edition (J2ME MIDlet), as a browser plug-in, etc. When a visual application, for example a WAP or xHTML browser requires a search, the visual application invokes the multimodal application 202a with appropriate input parameters. The input parameters comprise the search grammar, the search service to use, the base home URL to visit in order to display, etc. If required, an appropriate audible prompt, such as text, for text to speech (TTS) output, or as an audio file can be provided. The multimodal application's 202a appearance can be customized by specifying user interface (UI) parameters. For example, a custom logo can be introduced in the multimodal application. The multimodal application 202a comprises global grammar elements that can be invoked by the user using predefined multimodal invocation commands.

The multimodal application 202a can accept audio input, which, along with the search grammar, is transferred, via the mobile network, to a multimodal platform. For example, the search grammar can be directly passed as an extensible markup language (XML) document, or a URL to a voice extensible markup language (VXML) page, or an extensible hyper text markup language (xHTML). VXML is a predefined set of rules or a language that enables a user to browse or interact with a device using voice recognition technology. XML is a text document that contains mark-up tags for conveying the structure of data and enables efficient data interchange between devices on the intranet. xHTML is a combination of HTML and XML that is specifically applicable for intranet enabled devices.

The multimodal application 202a provides multiple modes of communication, inclusive of but not restricted to the voice mode, visual and haptic modes. When the voice mode is used, the microphone on the mobile device captures audio commands of the user. When the visual mode is used, data is captured on the mobile device on the keypad. For example, alpha-numeric data which may be represented in American standard code for information interchange (ASCII) form can be visually displayed. The multimodal application 202a interfaces with the native visual and voice resources of the mobile device. The multimodal application 202a can be installed on devices such as, but not restricted to Symbian operating system of Symbian Inc., USA, MS smartphone of Microsoft Inc., J2ME, binary run-time environment for wireless (brew), and Palm operating system of Palm Inc., USA, MS Pocket PC of Microsoft Inc., and MS Pocket PC phone edition of Microsoft Inc. The mobile device comprises a communication component and computing component. The computing component typically has a memory that stores data and instructions; a processor adapted to execute the instructions and manipulate the data stored in the memory; means for input, for example, a keypad, touch screen, microphone, etc.; and, means for output, for example, liquid crystal display (LCD), cathode ray tube (CRT), audio speaker, etc. The communication component is a means for communicating with other mobile devices over a network, for example, an Ethernet port, a modem, a wireless transmitter/receiver for communicating in a wireless communications network, etc.

Depending on the usage context, the multimodal application 202a can take multiple forms and can address a variety of user needs and enable different types of multimodality. Consider the case wherein a user desires to fill in a visual form on the UI using voice commands. The grammar elements in the voice command are recognized by the multimodal platform, and the synchronized and processed information is transferred back to the multimodal application 202a. The multimodal application 202a provides the synchronized and processed information as input to the visual application, for example in the form of an extended URL and the search term(s) filled into the visual form. The synchronized and processed information may be in the form of a single recognized search term, or as a list of possible recognized terms. The user can choose the correct item from the list of possible recognized terms and, once satisfied with the search term, the user can activate the search as is normally done with a visual-only application.

Examples of different variants of the multimodal application 202a are as follows. The "SearchBar" variant of the multimodal application 202a accepts audio input, which, along with the associated search grammar, is transferred via the mobile network to the multimodal platform. The SearchBar enables a user to go directly to a specific page of interest through voice input instead of having to navigate through several links. The SearchBar provides the result as input to the visual application, for example, in the form of an extended URL, and the search term(s) filled into the visual form. The "Inputbar" variant of the multimodal application 202a is applied where more general information is required by the visual application. For example, consider the case when a user needs to purchase an item using their mobile device. The user needs to fill in their residential address in the "shipping address" section of the form displayed on the mobile device. The user then brings up the InputBar, and fills in the form using multiple modes of input, for example, fills in the form using both voice commands and the keypad. The "Dictation-Bar" version of the multimodal application 202a is applied where the input is freeform, such as a text or e-mail message. For example, consider a case where a user sends a short message service (SMS) reply. The user selects DictationBar to input the text. The user can then visually correct the text that is not spelled accurately, i.e., recognized incorrectly. The user can accomplish this correction activity by visually selecting the inaccurate text section and thereafter speaking or modifying the text section by visually typing or selecting from alternate displayed text that has a close recognition confidence. The "PortalBar" version of the SeachBar is used to access web-pages, by directly accessing the web-pages using multiple modes of input, from a general portal, for example Yahoo!, without the requirement for navigating through multiple links. The "IP Bar" version of the multimodal application 202a enables a user to bookmark desired URL's with predefined voice commands, and the user can then access the desired URL's using voice commands. The bookmarking function is further described in co-pending application Ser. No. 10/211,117, titled "System and Method for Providing Multi-Modal Bookmarks," filed Aug. 2, 2002.

The multimodal application 202a can be preloaded on the mobile device, or downloaded onto the mobile device on demand, or it may be pre-burned onto the read only memory (ROM) of the mobile device. The multimodal application 202a can also be implemented as a multimodal web page, or as a web browser.

The multimodal system architecture of this invention allows the use of standard capabilities, for example Java, Applets, the integration and interfacing with web, installing new applications on the device, etc. The multimodal system architecture of this invention can leverage all these capabilities without requiring a replacement of the entire software or hardware infrastructure of the mobile device, for example, without requiring the installation of a new browser on the mobile device.

In the current art, a multimodal infrastructure with a complete and simultaneous activation of all its modes of communication, including voice, key input and visuals, demands a significant amount of the mobile device's and the multimodal platform's resources. The method and system disclosed herein provides a preferential mode activation feature, wherein, only a preferred mode chosen by the user is activated at any point in time. For example, the visual mode will be activated when the user taps once on the multimodal application 202a and indicates the preference for the visual mode only, following which, the user activates the voice mode by speaking or tapping twice.

The multimodal application 202a supports both sequential multimodality and simultaneous multimodality.

Sequential multimodality allows users to move seamlessly between visual and voice modes. Sequential multimodality offers real value when different steps of a single application are more effective or efficient in one mode than the other. For example, in a navigation application, it may be easier to speak the name of the place (voice mode) than to type it, yet it may be preferable to view a map (visual mode) than to listen to directions that may involve a half dozen turns. The swap between two modes may be initiated by the application, or by the user. Sequential multimodality is described in greater detail in U.S. patent application Ser. No. 10/119,614, titled "Mode-Swapping in Multi-Modal Telephonic Application," filed Apr. 10, 2002. Briefly, the state of the two modes, i.e., the visual and voice mode are synchronized. The multimodal application generates events relating to navigational activity being performed by a user in one mode. A representation of the events that have occurred in a multimodal session are recorded and are subsequently used to set the input in the second mode to a state equivalent to that which the input in the first mode would be in if the user had performed, on the input in the second mode, a navigational activity equivalent to that which the user performed on the input in the first mode.

In the case of simultaneous multimodality, where the device has both modes active, the user can communicate in the visual and voice mode simultaneously. For example, in a mapping example, a user can point to a street on the map and say: "Plan route, avoiding this street." In a retail banking application, with "From Account", "To Account", and "Amount" boxes on the screen, the user may enter the number "5000" in the amount box using the keypad, then simply speak "Transfer from Account 123 to Account 456; Enter" and all three entry boxes will be populated correctly and the information delivered to the multimodal platform 204. The synchronized and processed information from the multimodal platform 204 can be delivered in voice mode, visual, or both and provide positive confirmation of the transaction.

Figure 3:
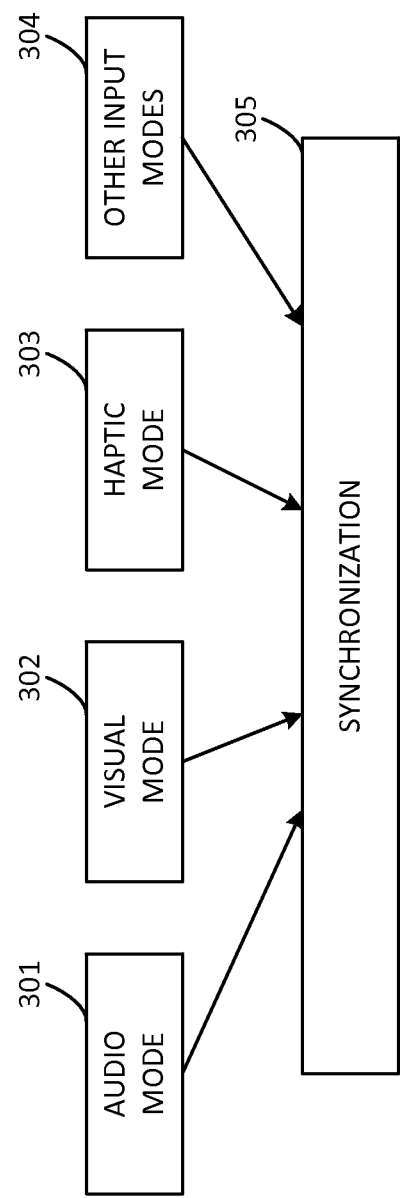
FIG. 3 illustrates the multiple modes of interaction between the user and the multimodal application.

FIG. 3 illustrates the multiple modes of interaction between the user and the multimodal application. The user communicates with the multimodal application 202a, using one or more of the following modes: audio mode 301, visual mode 302, such as through a stylus, and haptic mode 303, such as through a haptic device. The different modes are synchronized 305. A haptic mode is a mode of communication, or interface with a computing device. For example, a mobile phone with haptic capabilities enables a haptic mode of input. The haptic mode of communication is enabled through a tactile method, and uses a haptic device that senses body movement or in general, a user's intention. For example, using a haptic glove, a user can feel and move a ball, and this movement is simultaneously effected on the display of the device, wherein the ball can be made to move correspondingly on the display of the device.

In addition to the audio, visual and haptic modes of input, the multimodal application 202a can also accept other modes of input 304, for example, global positioning system (GPS) inputs. For example, the user can say: "Make a reservation over there" while pointing their mobile device at a restaurant across the road. Assume that the mobile device is GPS enabled and is capable of deriving the position coordinates of objects it is pointed at. In this case, in addition to the audio and haptic input, the GPS input is also transferred to the multimodal platform 204.

The multimodal system architecture of this invention enables push to talk over cellular (PoC) phones, wherein the push to talk command (PTT command) is transmitted to the multimodal platform for initiating or terminating a session. A session is initiated when the multimodal platform 204 becomes aware of the user, i.e., when the user is provided a plurality of modality interfaces and then the user invokes an initiation command through a predefined input. Similarly, the user can end a session with a predefined input, or session ends if the multimodal platform 204 ceases to register activity at the user's end.

The following example illustrates the multimodal application's 202a ability to provide multimodal capabilities. Consider a case wherein a user desires to locate "Edison, N.J. 08817" using the weblink Yahoo Maps on the user's mobile device. The user can double tap on the multimodal application 202a residing in the UI of the mobile device, and then the user can provide the spoken command: "Locate Edison, N.J. 08817". The method and system disclosed herein provides a means for mixing visual input tapping and speech inputs in a manner that is an easy and natural experience to the end user.

Once the user has finished inputting the search parameters, the user can submit the map request.

This invention can be effectively applied in a variety of networks and usage environments. For example, it can be internet based with web and WAP interfaces to mobile devices, or it can be linked to a corporate intranet, or other private networks. For example, in a corporate application, the multimodal application 202a can allow an employee of a firm to provide search input parameters specific to the local and network applications and resources of the firm. For example, an employee using the multimodal application 202a can search for "John Smith", and access John Smith's contact information in the corporate address book. The multimodal application 202a could formulate input parameters and have them available for accessing not only network resources and web based applications, but also for accessing resources within the mobile device.

The following example illustrates the use of this invention in field services. While inspecting a defective coke machine at the local gas station, Bill pulls out his handset and initiates the diagnostics application. Bill, then says: "Diagnostics for Coke machine". The device returns a list of available diagnostic tests. Bill scrolls and selects the "Cooling diagnostics" link, the second in the list, and sees a summary of the recommended diagnostics procedures for testing the machine. After performing a few diagnostic procedures, Bill concludes that one part needs to be replaced. Again using his handset, he switches to the purchasing part of the field application by saying: "New quote". The spoken command opens a quotation/order form. Bill says: "Add compressor XRT-65, quantity one", adding the correct part to the parts quotation. Then he issues the verbal commands: "Close quote" and "Fax to 555-233-2390" which faxes the parts quotations directly to the main office for processing.

The foregoing examples have been provided merely for the purpose of explanation and are in no way to be construed as limiting of the present method and system disclosed herein. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A method comprising:
    processing, by a mobile device, input information for an application executing on the mobile device, the input information received in a first mode of a plurality of modes of communication;
    transmitting, via a communications network, data indicative of the input information to a multimodal platform hosted by a service provider;
    receiving, from the multimodal platform, synchronized information generated by synchronizing, by the multimodal platform, the input information using a second mode of the plurality of modes of communication, wherein the mobile device is configured to switch between the first and second modes of communication based on a selection of the first and second modes and to continue execution of the application when switching between the first and second modes; and
    rendering the synchronized information for verification and modification in the second mode while continuing execution of the application.

2. The method of claim 1, wherein the plurality of modes of communication comprise audio, visual and haptic modes.

3. The method of claim 1, further comprising:
    determining that the input information comprises a search request;
    transmitting the search request and associated search grammar via the communications network to the multimodal platform;
    receiving search words determined by synchronizing the input information using the second mode;
    identifying grammar elements associated with the search request and the associated search grammar; and
    determining search words based on the identified grammar elements.

4. The method of claim 1, wherein the rendering is performed by a user interface application.

5. The method of claim 1, wherein the processing is performed by a multimodal application.

6. The method of claim 5, wherein the multimodal application is operable to render a search interface.

7. The method of claim 5, wherein the multimodal application is operable to render an input interface.

8. The method of claim 1, wherein the input information is freeform text.

9. The method of claim 1, wherein the input information is a uniform resource locator address.

10. The method of claim 5, wherein the multimodal application allows users to switch between visual and voice modes.

11. The method of claim 5, wherein the multimodal application allows users to simultaneously use voice and visual modes.

12. The method of claim 5, wherein the multimodal application further comprises global grammar elements that can be invoked by predefined multimodal invocations.

13. A mobile device comprising a processor and memory, the device configured to:
    execute a multimodal application operable to receive multimodal commands and send information representative of the multimodal commands to a multimodal platform communicatively coupled to a mobile communications network, the multimodal platform hosted by a service provider and configured to receive and synchronize the information and process the synchronized information to generate synchronized and processed information;
    receive the synchronized and processed information via the mobile communications network; and
    render the synchronized and processed information for verification and modification of the synchronized and processed information in one or more input modes, the mobile device being further configured to switch between the one or more input modes based on a selection of the one or more input modes and to continue execution of the multimodal application when switching between the modes and during generation of the synchronized and processed information.

14. The mobile device of claim 13, wherein the one or more input modes comprise audio and visual modes.

15. A method for processing, by a multimodal platform hosted by a service provider, multimodal information from a plurality of mobile devices connected to a mobile communications network, the method comprising:

receiving, via the mobile network, voice input information from a mobile device, the voice input information having been processed by a multimodal application operable to execute on the mobile device and receive inputs in voice and visual modes of communication, wherein the multimodal application is operative to allow a user to communicate both in the voice and visual modes of communication and switch between the voice and visual modes of communication based on a selection of one of the voice and visual modes;

synchronizing the voice input information to generate synchronized voice input information, the multimodal application being operative to use the synchronized voice input information for continued execution of the multimodal application using the voice and visual modes of communication; and processing the synchronized voice input information and transmitting the synchronized and processed information to the mobile device for rendering, verification, and modification of the synchronized and processed information in the selected one of the voice and visual input modes during continued execution of the multimodal application.

16. A method of inputting data on a mobile device, comprising:

in response to an indication that a voice input mode is to be used for receiving inputs to an application executing on the mobile device, executing a voice input function on the mobile device;

transmitting data indicative of voice input information to a multimodal platform via a communications network, the multimodal platform executing on at least one computing device;

receiving, via the communications network, processed information operable for inputting to the executing application, the processed information generated using the data indicative of the voice input information;

rendering the received processed information for verification and modification; and inputting the verified and modified processed information to the executing application, wherein the mobile device is configured to switch between the voice input mode and another mode of communication based on a user selection of the voice input mode and the another mode of communication and to continue execution of the executing application when switching between modes and during said inputting.

17. The method of claim 16, wherein the rendering comprises displaying the received processed information on a display device.

18. The method of claim 16, wherein the verification and modification is performed by receiving inputs received via a user input mechanism on the mobile device.

19. The method of claim 16, wherein the processed information comprises one or more voice-to-text conversions of the voice input information.

20. A non-transitory computer readable storage medium having computer executable instructions stored thereon, the instructions comprising:

instructions for activating an application on a mobile device;

instructions for, in response to an indication that a voice input mode is to be used for receiving inputs to the activated application, causing execution of a voice input application;

instructions for switching between the voice input mode and another mode of communication based on a selection of one of the voice input mode or the another mode of communication;

instructions for continuing execution of the application when switching between modes;

instructions for receiving voice input information by the voice input application;

instructions for sending data indicative of the voice input information to a multimodal application via a mobile communications network, the multimodal application executing on another device;

instructions for receiving information processed by the multimodal application using the data indicative of the voice input information;

instructions for rendering the received processed information for verification and modification by the voice input application; and instructions for inputting the verified and modified processed information to the activated application while continuing execution of the activated application.

* * * * *